(12) United States Patent
Karlsson

(10) Patent No.: US 7,747,366 B2
(45) Date of Patent: Jun. 29, 2010

(54) OIL TEMPERATURE PREDICTION AND VEHICLE PROTECTION

(75) Inventor: Rolf B. Karlsson, Grand Blanc, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 176 days.

(21) Appl. No.: 11/675,102

(22) Filed: Feb. 15, 2007

(65) Prior Publication Data

US 2008/0201036 A1    Aug. 21, 2008

(51) Int. Cl.
G01M 15/04 (2006.01)
G06F 7/00 (2006.01)
G06F 17/00 (2006.01)

(52) U.S. Cl. .............................. 701/35; 701/29; 701/51; 701/54; 701/58; 477/76

(58) Field of Classification Search ................... 701/29, 701/31, 25, 51, 54, 55, 58; 477/76, 98; 73/114.56
See application file for complete search history.

(56) References Cited

U.S. PATENT DOCUMENTS

| | | | | | |
|---|---|---|---|---|---|
| 5,319,963 | A | * | 6/1994 | Benford | 73/115.02 |
| 5,601,511 | A | * | 2/1997 | Michioka | 477/98 |
| 5,633,796 | A | * | 5/1997 | Cullen et al. | 701/30 |
| 5,681,237 | A | * | 10/1997 | Furukawa et al. | 477/98 |
| 5,960,669 | A | * | 10/1999 | Ohashi et al. | 74/335 |
| 6,454,676 | B1 | * | 9/2002 | Date et al. | 477/77 |
| 6,466,854 | B1 | * | 10/2002 | Henneken et al. | 701/65 |
| 6,769,526 | B2 | * | 8/2004 | Iida et al. | 192/82 T |
| 2002/0046618 | A1 | * | 4/2002 | Yamashita et al. | 74/335 |
| 2003/0233186 | A1 | * | 12/2003 | Chess | 701/95 |
| 2005/0209760 | A1 | * | 9/2005 | Tabata et al. | 701/53 |

* cited by examiner

Primary Examiner—Jack Keith
Assistant Examiner—Matthew Lichti

(57) ABSTRACT

A vehicle having an oil temperature prediction algorithm that allows for protection of the vehicle is disclosed. The algorithm may predict an oil sump temperature for a manual transmission and, upon reaching a first transmission heat threshold, enter a transmission protection mode.

9 Claims, 3 Drawing Sheets

OIL TEMPERATURE PREDICTION AND VEHICLE PROTECTION

BACKGROUND OF THE INVENTION

The present application relates generally to a vehicle having an oil temperature prediction algorithm that allows for protection of the vehicle.

There are certain types of automotive vehicles that have powerful engines and are designed to be driven at high speeds for relatively long periods of time. Some of these vehicles may have manual transmissions and differentials where oil sumps are used for passive cooling and lubricating of the gears. The high power levels flowing through the driveline at sustained top speed operation, coupled with the lack of any active cooling for the oil in the sumps, can result in oil sump temperatures exceeding desired temperature limits. Thus, passive cooling may not be sufficient in some cases to keep the transmission or differential sump below the particular temperature limit for the full duration of high speed travel.

For manual transmissions, one possible solution for preventing overheating is to provide an active cooling pump for the transmission. In this type of system, the oil is pumped through the transmission and a cooler in order to maintain the oil temperature within an acceptable temperature range. But this may not be desirable for particular vehicles due to cost, packaging concerns, durability requirements, timing, etc.

A possible low cost solution that does not create packaging, durability, timing or other such concerns is to limit the vehicle top speed and/or engine power output electronically. But this reduces the overall vehicle performance, which may make the vehicle less desirable for some customers. Another possible solution—rather than electronically limiting vehicle top speed for all driving conditions—is to add a temperature sensor to the sump of the manual transmission. Then, the vehicle speed/engine power limit is activated only when the temperature reading is above a certain temperature value. But, for some vehicles, even this may be undesirable from a cost, packaging, durability or timing standpoint.

Thus, it would be advantageous to provide protection from excessive oil temperatures in manual transmission sumps and/or differential sumps, while minimizing the potential drawbacks in prior solutions.

SUMMARY OF THE INVENTION

An embodiment contemplates a method for determining an estimated oil sump temperature of a component of a vehicle, the method comprising the steps of: obtaining an initial oil sump temperature; determining a heat input to the component based on vehicle operating parameters; determining a heat loss from the component based on the vehicle operating parameters; adding the heat input to and subtracting the heat loss from the initial oil sump temperature to obtain the estimated oil sump temperature; and storing the estimated oil sump temperature in an electronic control module of the vehicle.

An embodiment contemplates a method for protecting a manual transmission of a vehicle, the method comprising the steps of: obtaining an initial estimated transmission oil sump temperature; estimating a heat input to the manual transmission based on vehicle operating parameters; estimating a heat loss from the manual transmission based on vehicle operating parameters; adding the heat input to and subtracting the heat loss from the initial estimated transmission oil sump temperature to obtain an incremental estimated oil sump temperature; determining if the incremental estimated transmission oil sump temperature is greater than a first transmission heat threshold; and entering a transmission protection mode if the incremental estimated transmission oil sump temperature is greater than the first transmission heat threshold.

An embodiment contemplates a vehicle comprising an engine; a manual transmission including a gear set and an oil sump; and an electronic control module operatively engaging the engine and the manual transmission and including an initial oil sump temperature estimator, a transmission heat input estimator, a transmission heat loss estimator, and an incremental oil sump temperature estimator that adds a first value from the heat input estimator to, and subtracts a second value from the heat loss estimator from, a third value from the initial oil sump temperature estimator to calculate an incremental estimated oil sump temperature.

An advantage of an embodiment is that an effective means for allowing maximum vehicle performance, while minimizing potential oil sump overheating, is provided. Only when the oil temperature is predicted to be above a predetermined threshold is vehicle performance limited. This is accomplished with minimal impact to cost, complexity, packaging, and durability.

An advantage of an embodiment is that overheating protection can be provided to a manual transmission without requiring the use of an active cooling system.

DETAILED DESCRIPTION

Figure 1:
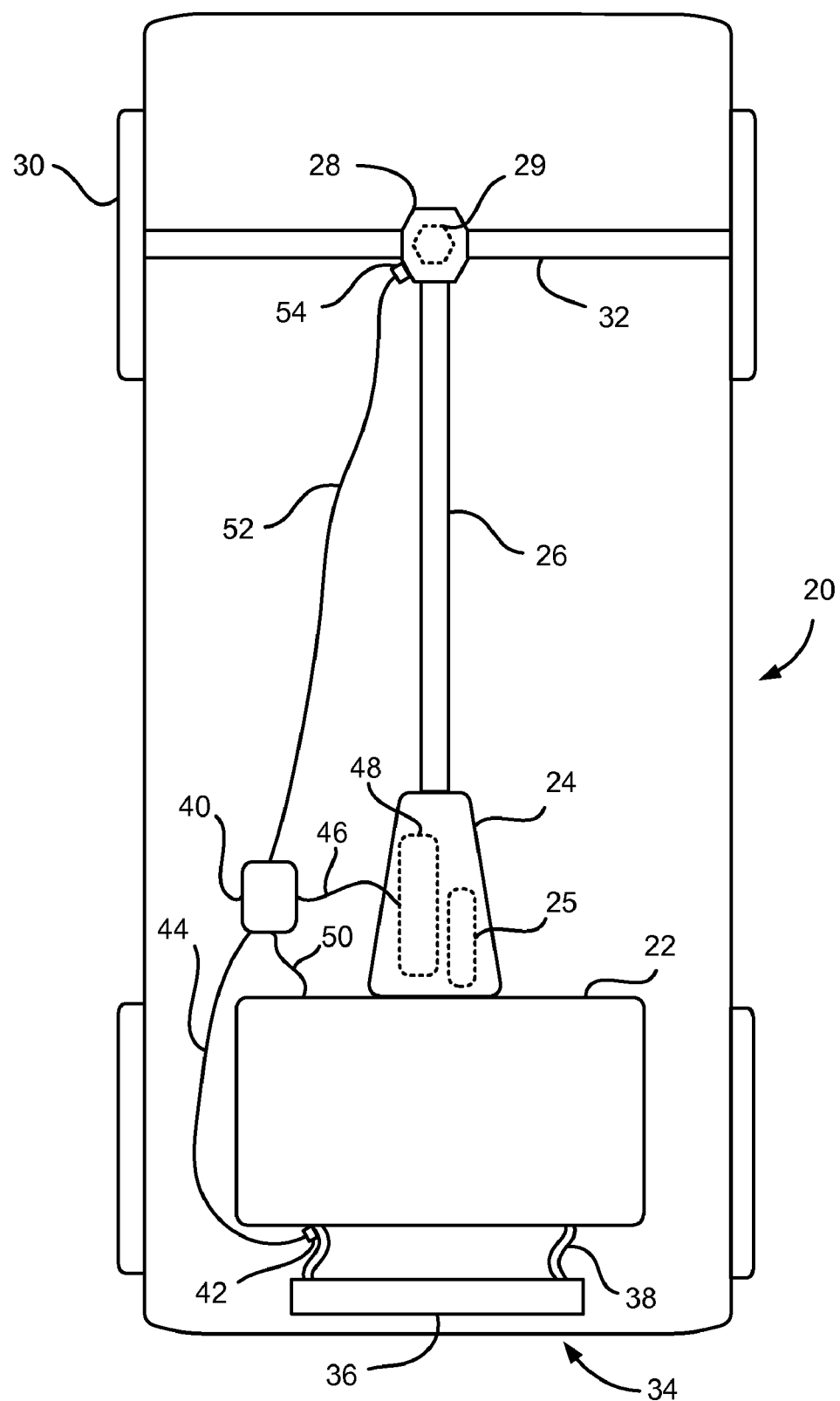
FIG. 1 is a schematic diagram of a vehicle incorporating an oil temperature prediction algorithm.

FIG. 1 illustrates a vehicle 20, having an engine 22 mounted therein. The engine 22 drives a manual transmission 24, which, in turn, drives a driveshaft 26. A differential 28 divides the power from the driveshaft 26 and sends the torque to the vehicle wheels 30 via rear drive axles 32. The transmission 24 has an oil sump 25 and the differential 28 has an oil sump 29. While a rear wheel drive vehicle 20 is illustrated, the present invention is applicable to a front wheel drive or all wheel drive vehicle as well.

The engine 22 includes a cooling system 34 having a radiator 36 with hoses 38 that direct coolant to and from the engine 22. An electronic control module (ECM) 40 (also called engine control module) may communicate 44 with a coolant temperature sensor 42 that provides temperature information relating to the coolant in the cooling system 34. The coolant temperature sensor 42 may interface with the cooling system 34 wherever is a desirable location in order to obtain a suitable coolant temperature measurement. The ECM 40 may also communicate 46 with the transmission 24, or other vehicle component (e.g., infer from vehicle and engine speeds), to be able to determine in which gear 48 the transmission 24 is operating. The ECM may also communicate 50 with the engine 22 to determine, for example, the engine speed (i.e., revolutions per minute) and engine torque produced. A vehicle speed sensor 54 may communicate 52 with the ECM 40 to allow the vehicle speed to be determined. Various systems and methods for determining or estimating vehicle speed are known to those skilled in the art, any one of which may be employed, if so desired.

Figure 2A:
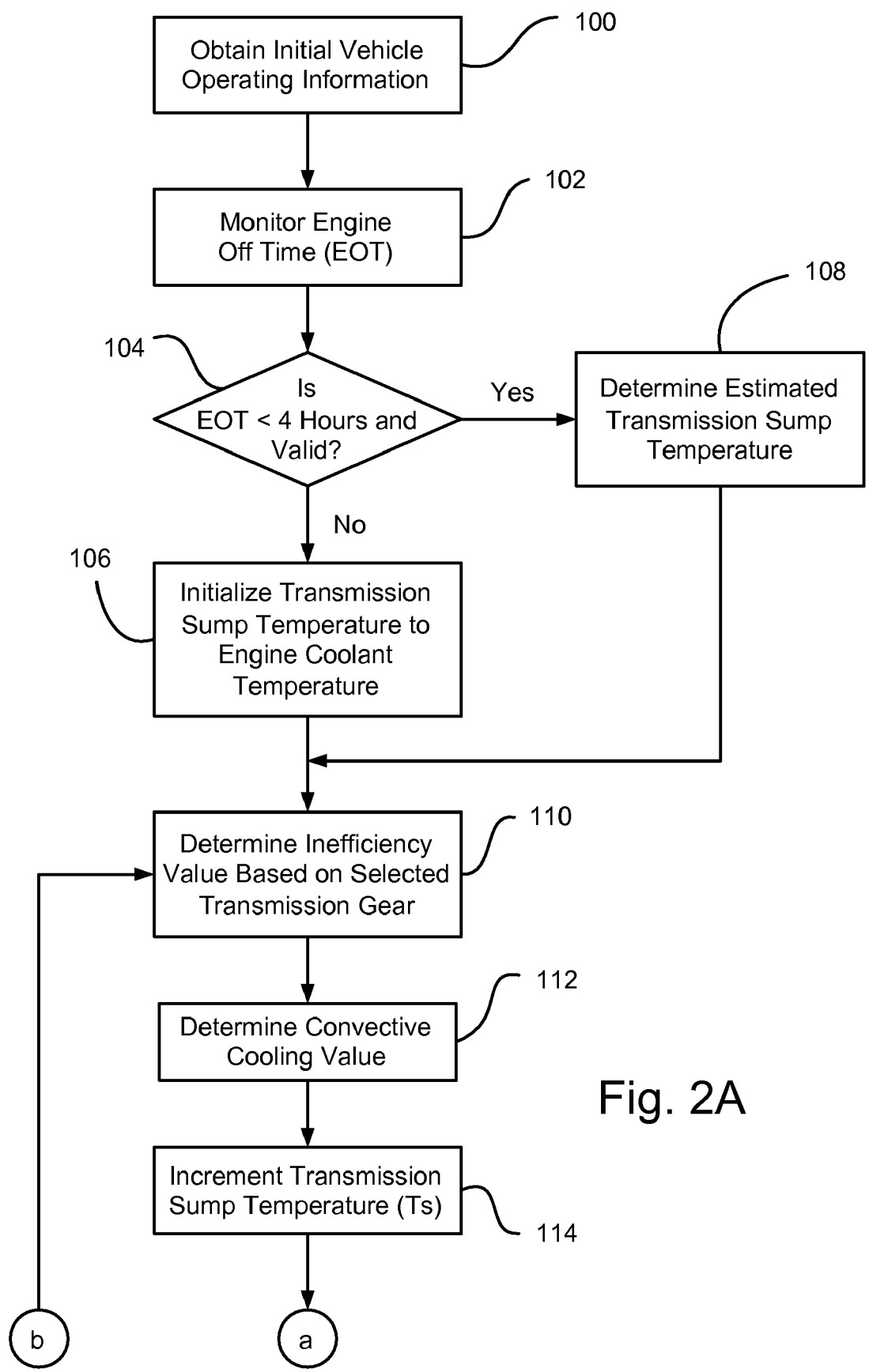
FIGS. 2A and 2B are a flow chart illustrating the oil temperature prediction and protection algorithm that may be applied to the vehicle illustrated in FIG. 1.
Figure 2B:
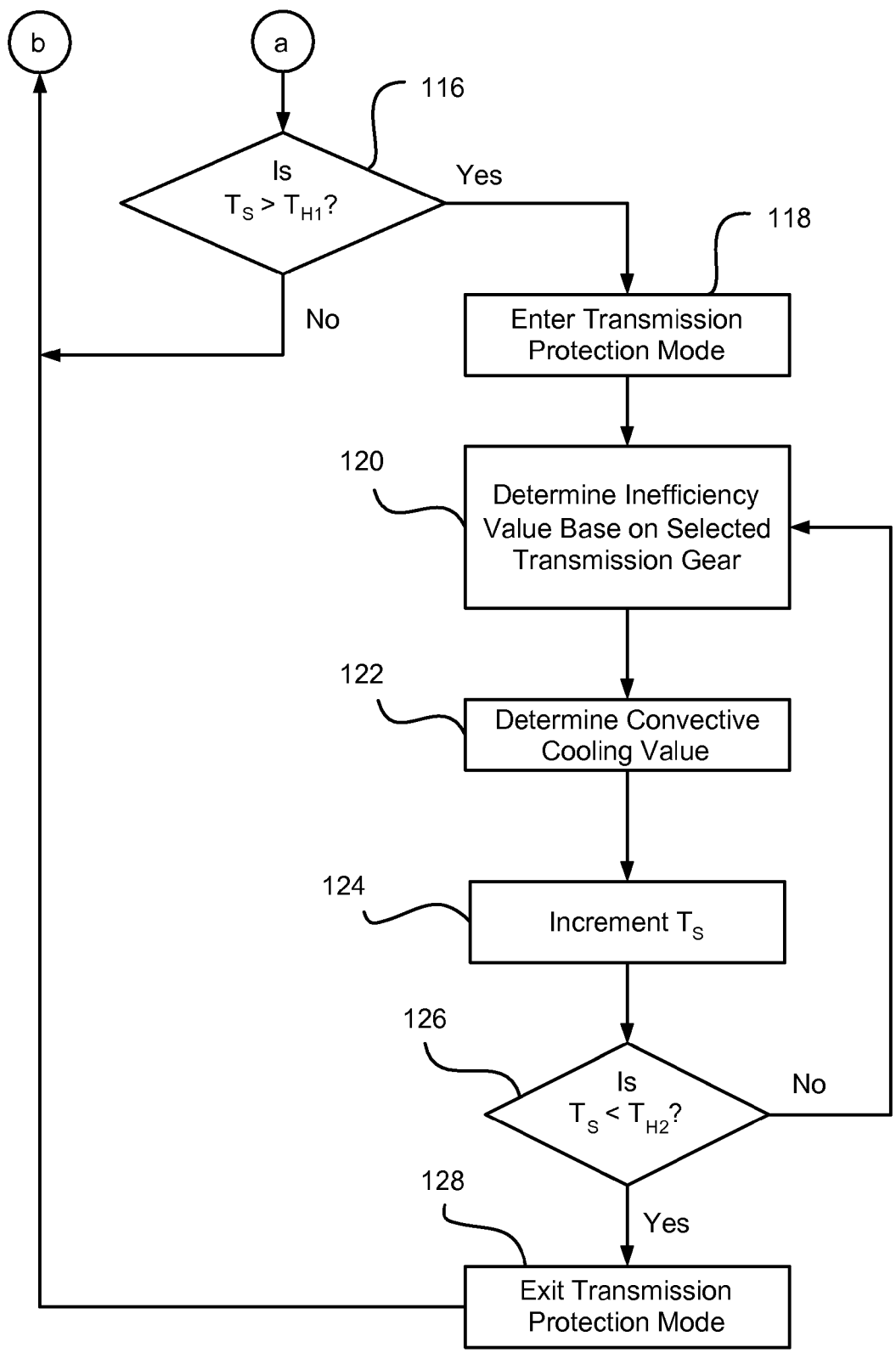

FIGS. 2A and 2B illustrate an oil temperature prediction and thermal protection algorithm that may be applied to the manual transmission 24 for the vehicle 20 illustrated in FIG. 1. After starting the vehicle 20, initial vehicle operating information is obtained by the ECM 40, block 100. Also, the amount of time the engine 22 has been off (EOT) has been monitored, block 102. That is, the amount of time that has lapsed between this engine start-up and the last time the engine 22 was turned off is tracked.

If the EOT is not less than a predetermined amount of time (e.g., four hours), or if the EOT is not indicating a valid value, block 104, then the initial estimated transmission sump temperature (Ts) is set to the engine coolant temperature, block 106. This may be set whenever the first available engine coolant temperature sensor value is obtained. If the engine coolant temperature value in the ECM 40 is not valid, it may be assumed to be eighty degrees Celsius (default value).

If, on the other hand, the EOT is less than four hours, and the EOT is indicating a valid value, then the initial estimated transmission sump temperature (Ts) is determined, block 108. This determination may be made by employing a lookup table, or alternatively, by employing a mathematical formula. A lookup table formula may be, for example, Ts=Tao+(Tso−Tao)*(EXPTRATEMP). The temperature Tao is an ambient air temperature stored in memory from when the engine was last turned off (in degrees Celsius), the temperature Tso is a transmission sump temperature stored in memory from when the engine was last turned off (in degrees Celsius), and EXPTRATEMP is a lookup table function based on the EOT in seconds. The EXPTRATEMP function may have values, for example, of 1 for EOT=0, 0.599 for EOT=3600, and 0.2123 for EOT=14400. Other EXPTRATEMP values for various EOT times may be included in the lookup table as well, if so desired. A mathematical formula may be Ts=Tao+(Tso−Tao)*$e^{(-EOT/3304)}$, where EOT is in seconds and the exponential is a value that approximates the gradual reduction of the oil sump temperature down toward the ambient air temperature.

With an initial sump temperature initialized/determined, the factors adding to and removing heat from the transmission are determined. Heat input to the transmission may be calculated from driveline power (from engine torque provided to the transmission and engine speed) and transmission efficiency for first through fifth gear with torque, engine speed, and sump temperature as inputs. One of the factors related to heat added to the transmission sump 25, then, is an inefficiency value (IEFF) that relates to the heat input to the transmission 24 based on the gear 48 in which the transmission 24 is operating, (i.e., mechanical gear inefficiency).

The IEFF is determined based on the selected transmission gear 48, block 110. The inefficiency value may be determined by calculations made from a lookup table. For example, in first gear, IEFF may be calculated as IEFF=(C1+C2*|ENGTRQACT|+C3*ENGSPD*$e^{(-C4*Ts)}$)/|ENGTRQACT|; where |ENGTRQACT| is the absolute value of the engine torque being produced, in Newton-Meters, ENGSPD is the engine rotational speed, in revolutions per minute, and C1, C2, C3, and C4 are constants that are determined for a particular vehicle, engine and transmission combination by engineering tests and computer modeling that isolates the gear efficiency and its effect on heat build-up in the sump. The absolute value of the torque (|ENGTRQACT|) is used because engine braking also rejects heat to the transmission 24. An example of constants that may be used in the equation when in first gear is IEFF=(0.522+0.05*|ENGTRQACT|+0.0011*ENGSPD*$e^{(-0.03*Ts)}$)/|ENGTRQACT|.

Examples of the equations for other gears, with the constants determined, may include the following. In second gear, IEFF may be calculated as IEFF=(0.49+0.05*|ENGTRQACT|+0.0011*ENGSPD*$e^{(-0.03*Ts)}$)/|ENGTRQACT|. In third gear, IEFF may be calculated as IEFF=(0.72+0.031*|ENGTRQACT|+0.001*ENGSPD*$e^{(-0.03*Ts)}$)/|ENGTRQACT|. In fourth gear, IEFF may be calculated as IEFF=(0.62+0.015*|ENGTRQACT|+0.002*ENGSPD*$e^{(-0.03*Ts)}$)/|ENGTRQACT|. In fifth gear, IEFF may be calculated as IEFF=(0.75+0.034*|ENGTRQACT|+0.002*ENGSPD*$e^{(-0.03*Ts)}$)/|ENGTRQACT|. For the case where the transmission 24 is in reverse gear or ENGTRQACT=0, then IEFF may be set at 0.05. IEFF is a non-dimensional variable and relates to a gear-based heat build-up factor for use in estimating the sump temperature. As an alternative, one may implement another look-up table to replace the exponential functions in these equations (which are meant to account for viscous losses at different oil temperatures). If the determination of the gear 48 in which the transmission 24 is operating is not valid in the ECM 40, it may be assumed to be fifth gear (default value) for the IEFF calculation. If the ENGTRQACT and ENGSPD are not valid in the ECM 40, then no action may be required since the ECM 40 in the typical vehicle 20 switches to a limp-home mode.

In order to estimate the sump temperature, the heat rejection from the transmission 24 is also calculated. The heat rejection (cooling value) is calculated from a lumped convective heat transfer coefficient (HA), block 112. The value for HA may be a function of vehicle speed and ambient air temperature, and may be approximated using a second order curve fit to experimental test data or a look-up table with interpolation. The value for the corrective cooling value may be calculated as HA=C5*(VEHSPD)$^2$+C6*VEHSPD+C7, where VEHSPD is the vehicle speed in kilometers per hour, and C5, C6 and C7 are constants that are determined for a particular vehicle, engine and transmission combination by engineering tests and computer modeling that account for heat dissipation from the transmission 24. An example of constants that may be used in the equation is HA=0.0004*(VEHSPD)$^2$+0.1*VEHSPD+2.4. If the VEHSPD value in the ECM 40 is not valid, it may be assumed zero (default value) for this calculation. The units for HA are watts per degree Celsius.

A look-up table with multiple points and interpolation may be more desirable for calculating HA than a second order curve fit for many vehicle applications. If a second order curve is employed, then it may be desirable for the curve to be accurate at the two ends of the curve, with a small over-predicting of convective cooling in a moderate speed range (i.e., under predicts sump temperature) and a small under-predicting of convective cooling around the moderate-to-high speed range (i.e., over predicts sump temperature). This may allow for reasonable overall accuracy during mixed driving cycles, with relatively high accuracy at and near vehicle top speed.

The net heat transfer to or from the transmission is calculated and the transmission sump temperature (Ts) is incremented, block 114. The heat transfer calculations and the temperature incrementing occurs once each selected time interval, which may be, for example, one second. The estimated temperature may be incremented by the equation Ts=Ts+(|ENGTRQACT|*ENGSPD*(2π/60)*IEFF−HA*(Ts−Ta))/$C_{THM}$, where Ta is the current ambient air temperature in degrees Celsius, 2π/60 is a constant used to convert the engine torque and speed into power in watts, and $C_{THM}$ is a constant, the value of which is determined for a particular vehicle, engine and transmission combination by engineering tests and computer modeling that accounts for the transmission thermal mass in units of Joules per degree Celsius. As an example, $C_{THM}$ may be equal to about 30000.

The transmission thermal mass $C_{THM}$ may be estimated by collecting stabilized (steady-state) transmission temperatures at several speeds in at least two different gears to isolate gear efficiency (IEFF) and convective cooling (HA), with the thermal mass being set based on the temperature rise rate during the stabilized vehicle operation. The ambient air temperature may be estimated by the ECM 40 if no sensor on the vehicle 20 is present to detect this temperature. If the Ta value in the ECM 40 is not valid, it may be assumed to be thirty degrees Celsius (default value) for this calculation.

The estimated transmission sump temperature (Ts) is compared to a first transmission heat threshold ($T_{H1}$), block 116. The value for $T_{H1}$ is preferably set at a temperature below an undesirable temperature operating range for the transmission 24. The first transmission heat threshold may be, for example, $T_{H1}$=138 degrees Celsius. The particular threshold temperature may depend upon the transmission 24 to which this algorithm is being applied. If Ts is not greater than $T_{H1}$, then the loop returns to block 110 to continue calculating the heat generated in and dissipated from the transmission 24, and incrementing Ts.

If, on the other hand, Ts>$T_{H1}$, then the ECM 40 enters a transmission protection mode, block 118. The transmission protection mode may include reducing the available engine torque, which may be ramped down over a predetermined time interval, such as for example sixty seconds, in order to avoid any abrupt throttle response changes. The amount of the engine torque level reduction may be a predetermined amount or it may be adjusted repeatedly during this protection mode so that the maximum heat input to the transmission 24 is just less than (or alternatively equal to) the available convective heat rejection, in order to maximize customer performance. In the latter case, the maximum available engine torque may be reduced to ENGTRQACT=HA*(Ts−Ta)/(ENGSPD*2π/60*IEFF). The transmission protection mode may also include displaying a signal to the vehicle driver that the engine power is reduced. A natural reaction by the vehicle driver may be to downshift from fifth the fourth gear, which will then increase the available engine torque, and coincidentally will improve the transmission cooling if the fourth gear is a 1:1 ratio.

While in the transmission protection mode, estimated sump temperature calculations continue. The inefficiency value (IEFF) based on the selected transmission gear is determined, block 120, the convective cooling value (HA) is determined, block 122, and the transmission sump temperature (Ts) is incremented, block 124. At this point in the transmission protection mode, the estimated transmission sump temperature (Ts) is compared to a second transmission heat threshold ($T_{H2}$), block 126. The value for $T_{H2}$ is preferably set at a temperature at least several degrees below $T_{H1}$. The second transmission heat threshold may be, for example, $T_{H2}$=135 degrees Celsius. The particular threshold temperature may depend upon the transmission 24 to which this algorithm is being applied. If Ts is not less than $T_{H2}$, then the loop returns to block 120 to continue calculating the heat generated in and dissipated from the transmission 24, and incrementing Ts.

If, on the other hand, Ts<$T_{H2}$, then the ECM 40 exits the transmission protection mode, block 128. With the deactivation of the transmission protection mode, the full available torque is restored. Any signal to the driver is deactivated. Also, a flag or other service indicator may be set in the ECM 40 to alert service personnel in the future that the transmission protection mode had been activated for this vehicle 20. Then the loop returns to block 110 to continue calculating the heat generated in and dissipated from the transmission 24, and incrementing Ts. This loop, as mentioned above, may be repeated, for example, about once every second.

One will note that the predictive algorithm just described estimates the transmission oil temperature in the sump 25 and responds in some way when the predicted transmission oil temperature reaches an upper acceptable limit. The algorithm takes into account mechanical efficiencies of the transmission 24 in each gear 48, the thermal mass of the transmission 24, and the convective cooling available to the transmission 24, which may be determined from math-based and/or hardware-based thermal development. This information is combined with existing signals in the ECM 40 to estimate the internal heat generation and external heat transfer of the transmission 24 about every second, and store an estimated transmission sump temperature (Ts). When the estimated temperature reaches the first temperature limit ($T_{H1}$), a response can be initiated, such as, for example, reducing the engine torque, the vehicle top speed or engine power in order to protect the transmission 24. Then, when the estimated temperature is reduced sufficiently (below $T_{H2}$), the protection response is ceased. This can all be accomplished without the need to add a temperature sensor to the transmission 24 or to add a transmission oil cooling circuit to the vehicle 20.

While the particular example discussed herein related to the manual transmission 24, a similar approach may be used to estimate the oil sump temperature for the differential 28 as well. Again, temperature protection is obtained without the need for additional hardware on the vehicle 20.

While certain embodiments of the present invention have been described in detail, those familiar with the art to which this invention relates will recognize various alternative designs and embodiments for practicing the invention as defined by the following claims.

What is claimed is:

1. A method for determining an estimated transmission oil sump temperature of a manual transmission of a vehicle, the method comprising the steps of:
    (a) obtaining an initial transmission oil sump temperature;
    (b) determining a heat input to the manual transmission based on vehicle operating parameters, including determining in which one of a plurality of gears the manual transmission is operating; calculating a mechanical inefficiency value for the one gear by solving the equation IEFF=(C1+C2*|ENGTRQACT|+C3*ENGSPD*e.sup.(−C4*Ts))/|ENGTRQACT|, where IEFF is the mechanical inefficiency value, |ENGTRQACT| is an absolute value of a torque being produced by an engine, ENGSPD is a rotational speed of the engine, Ts is a current value of the estimated transmission oil sump temperature, and C1, C2, C3 and C4 are constants that are based in part on the one gear in which the manual transmission is operating; the heat input to the manual transmission being determined by (|ENGTRQACT|*ENGSPD*(2.pi./60)*IEFF;
    (c) determining a heat loss from the manual transmission based on the vehicle operating parameters;
    (d) adding the heat input to and subtracting the heat loss from the initial transmission oil sump temperature to obtain the estimated transmission oil sump temperature;
    (e) storing the estimated transmission oil sump temperature in an electronic control module of the vehicle;
    (f) determining if the estimated transmission oil sump temperature is greater than a first transmission heat threshold; and
    (g) entering a transmission protection mode if the estimated transmission oil sump temperature is greater than the first transmission heat threshold.

2. The method of claim 1 wherein step (a) is further defined by the initial transmission oil sump temperature being set to an engine coolant temperature.

3. The method of claim 1 wherein step (a) is further defined by:
monitoring an engine off time;
comparing the engine off time to a predetermined time period; and
calculating the initial transmission oil sump temperature by solving the equation $Ts=Tao+(Tso-Tao)*e^{(-EOT/3304)}$, where Ts is the initial transmission oil sump temperature, Tao is an ambient air temperature at a time an engine was last turned off, Tso is a transmission oil sump temperature at the time the engine was last turned off, and EOT is the engine off time in seconds, if the engine off time is less than the predetermined time period.

4. The method of claim 1 wherein step (c) is further defined by:
determining a vehicle speed;
calculating a heat transfer coefficient by solving the equation $HA=C5*(VEHSPD)^2+C6*VEHSPD+C7$, where HA is the heat transfer coefficient, VEHSPD is the vehicle speed, and C5, C6 and C7 are constants; and
using the heat transfer coefficient as a factor when determining the heat loss from the manual transmission.

5. The method of claim 1 wherein step (d) is further defined by the heat input being $|ENGTRQACT|*ENGSPD*(2\pi/60)*IEFF/C_{THM}$ and the heat loss being $HA*(Ts-Ta))/C_{THM}$, where |ENGTRQACT| is an absolute value of a torque being produced by an engine, ENGSPD is a rotational speed of the engine, Ts is a current value of the estimated transmission oil sump temperature, Ta is a current ambient air temperature, IEFF is a mechanical inefficiency value of the manual transmission, HA is a convective heat transfer coefficient, and $C_{THM}$ is a thermal mass of the manual transmission.

6. The method of claim 1 further including the steps of:
(h) estimating a second heat input to the manual transmission based on the vehicle operating parameters;
(i) estimating a second heat loss from the manual transmission based on the vehicle operating parameters;
(j) adding the second heat input to and subtracting the second heat loss from the estimated transmission oil sump temperature to obtain a second estimated transmission oil sump temperature;
(k) determining if the second estimated transmission oil sump temperature is less than a second transmission heat threshold; and
(l) exiting the transmission protection mode if the transmission protection mode was entered and the second estimated transmission oil sump temperature is less than the second transmission heat threshold.

7. The method of claim 6 wherein the second transmission heat threshold is at least three degrees Celsius lower than the first transmission heat threshold.

8. The method of claim 1 wherein step (g) is further defined by reducing a maximum allowable engine torque output when the transmission protection mode is entered such that a new estimated heat input to the manual transmission is less than or equal to a new estimated heat loss from the manual transmission.

9. The method of claim 8 wherein step (g) is further defined by the maximum allowable engine torque output being reduced by ramping down the maximum allowable engine torque output over a predetermined time interval.

* * * * *